(12) United States Patent
Goodman et al.

(10) Patent No.: US 7,827,185 B2
(45) Date of Patent: Nov. 2, 2010

(54) APPARATUS FOR MANAGING OUTPUTS OF APPLICATIONS

(75) Inventors: Brian D. Goodman, Brooklyn, NY (US); Frank Lawrence Jania, Chapel Hill, NC (US); Vincent Lauria, New York, NY (US); Darren Mark Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 11/840,505

(22) Filed: Aug. 17, 2007

(65) Prior Publication Data

US 2008/0046399 A1 Feb. 21, 2008

(30) Foreign Application Priority Data

Aug. 17, 2006 (GB) .................................. 0616374.5

(51) Int. Cl.
*G06F 17/30* (2006.01)
(52) U.S. Cl. .................... 707/748; 707/758; 706/12; 706/13; 706/14
(58) Field of Classification Search .............. 707/748, 707/758; 706/12–14
See application file for complete search history.

(56) References Cited

U.S. PATENT DOCUMENTS 5,875,108 A 2/1999 Hoffberg 6,606,411 B1* 8/2003 Loui et al. ................ 382/224
2002/0165838 A1* 11/2002 Vetter .......................... 706/20
2008/0256031 A1* 10/2008 Chen et al. ..................... 707/2

FOREIGN PATENT DOCUMENTS

EP 1 387 283 A1 2/2004

OTHER PUBLICATIONS

Neal, J.G. et al, "Multi-Modal Output Composition for Human Computer Dialogue," AI Systems in Government Conference, 1989, Proceedings of the Annual Washington, DC, USA, Mar. 27-31, 1989, pp. 250-257.
PCT/EP2007/051594 International Search Report, Jun. 26, 2007.

* cited by examiner

*Primary Examiner*—John R. Cottingham
*Assistant Examiner*—Noosha Arjomandi
(74) *Attorney, Agent, or Firm*—Kunzler Needham Massey & Thorpe

(57) ABSTRACT

An apparatus for managing outputs of a first application and a second application is provided. Each application is operable to execute on a data processing system and output of the first application is executed on the data processing system. The apparatus comprises a classifier for associating the first application and the second application with classification data, wherein the classification data is stored in a classification data structure; a comparator for comparing the classification data associated with the first application and the second application with the classification data structure to determine a priority; and a generator, responsive to determination of the priority, for generating metadata associated with at least one of: the output of the first application and the output of the second application.

12 Claims, 7 Drawing Sheets

Class Property database

| Class | Property | Property logic execution data |
|---|---|---|
| Media player | Real Time | Root/Property_Logic/ Real_Time.exe |
| Collaboration | Catch up | Root/Property_Logic/Catch_up.exe |
| Browser | Real Time | Root/Property_Logic/Real_Time.exe |
| Audio | Real Time | Root/Property_Logic/Real_Time .exe |

FIG. 4

Class priority database

| Class of application | Media player | Collaboration | Browser | Audio |
|---|---|---|---|---|
| Media player | Go_to "Application priority database" | Collaboration | Browser | Emphasise Audio |
| Collaboration | Collaboration | Go_to "Application priority database" | Browser | Emphasise Audio |
| Browser | Browser | Collaboration | Go_to "Application priority database" | Audio |
| Audio | Emphasise Audio | Emphasise Audio | Audio | Go_to "Application priority database" |

FIG. 5

Rule base

| Emphasised Class | Rule | Rule logic execution data |
|---|---|---|
| Media player | Increase volume by 50% | Root/Rule_Logic/Volume.exe |
| Collaboration | Bring to front | Root/Rule_Logic/Focus.exe |
| Browser | Bring to front | Root/Rule_Logic/Focus.exe |
| Audio | Increase volume by 50% | Root/Rule_Logic/Volume.exe |

FIG. 6

Application priority database

| Collaboration | |
|---|---|
| Application | Priority |
| Instant messaging | 1 |
| Email | 2 |

FIG. 7

APPARATUS FOR MANAGING OUTPUTS OF APPLICATIONS

CROSS REFERENCE TO RELATED APPLICATIONS

This application is based upon and claims the benefit of priority from international application PCT/EP2007/051594, which has a priority date of Aug. 17, 2006. The entire contents of PCT/EP2007/051594 are incorporated herein by reference.

BACKGROUND OF THE INVENTION

Data processing systems are usually provided with a graphical user interface (GUI) to allow an end user to control the data processing system and to present the results of user actions on the system display. The GUI can take the form of a "desktop" which utilizes a physical desktop metaphor.

A user typically has multiple applications running simultaneously on their computer desktop. In some prior art systems, it is possible for multiple applications to be displayed on a desktop e.g. wherein each application is displayed in one or more separate windows. Thus, outputs (e.g. text, audio signals, video signals etc.) of multiple applications can be executed simultaneously on the desktop. This allows a user to maintain their main focus on an application and maintain focus of one or more further applications using their peripheral vision.

In some prior art systems however, it is not possible or a user may not wish to display multiple applications simultaneously. Thus, an executing application takes full control of the desktop. For example, presentation material in the form of "slides" can be configured to take full control of the desktop, such that no other application can be viewed by the user.

In a prior art solution, another application can use an "interrupt model" to attempt to attract the user's focus. For example, an audio signal (i.e. an interrupt) is played; a textual notification (i.e. an interrupt) is displayed on top of the executing application that has full control of the desktop etc. The interrupt model is satisfactory in cases where the user is willing to accept an interrupt (e.g. when a notification comprising a warning associated with a low battery is displayed). In other cases, one or more interrupts can be frustrating to a user.

In another prior art solution, output from multiple applications can be executed simultaneously, for example, multiple audio signals can be played simultaneously. This can be incomprehensible to a user.

Thus, there is a need for an improved output handling mechanism.

BRIEF SUMMARY OF THE INVENTION

According to a first aspect there is provided, an apparatus for managing outputs of a first application and a second application, each application operable to execute on a data processing system, wherein output of the first application is executed on the data processing system, the apparatus comprising: a classifier for associating the first application and the second application with classification data, wherein the classification data is stored in a classification data structure; a comparator for comparing the classification data associated with the first application and the second application with the classification data structure to determine a priority; and a generator, responsive to determination of the priority, for generating metadata associated with at least one of: the output of the first application and the output of the second application.

According to a second aspect there is provided, a method for managing outputs of a first application and a second application, each application operable to execute on a data processing system, wherein output of the first application is executed on the data processing system, comprising the steps of: associating the first application and the second application with classification data, wherein the classification data is stored in a classification data structure; comparing the classification data associated with the first application and the second application with the classification data structure to determine a priority; and generating, in response to determination of the priority, for metadata associated with at least one of: the output of the first application and the output of the second application.

According to a third aspect there is provided a computer program comprising program code means adapted to perform all the steps of the method described above when said program is run on a computer.

It should be understood that the representation herein of a class, a class property; class priorities; rules; application priorities etc. are exemplary.

BRIEF DESCRIPTION OF THE DRAWINGS

The present invention will now be described, by way of example only, with reference to preferred embodiments thereof, as illustrated in the following drawings:

FIG. 4 is a representation of a class property database;

FIG. 5 is a representation of a class priority database;

FIG. 6 is a representation of a rule base; and

FIG. 7 is a representation of an application priority database.

DETAILED DESCRIPTION OF THE INVENTION

Figure 1:
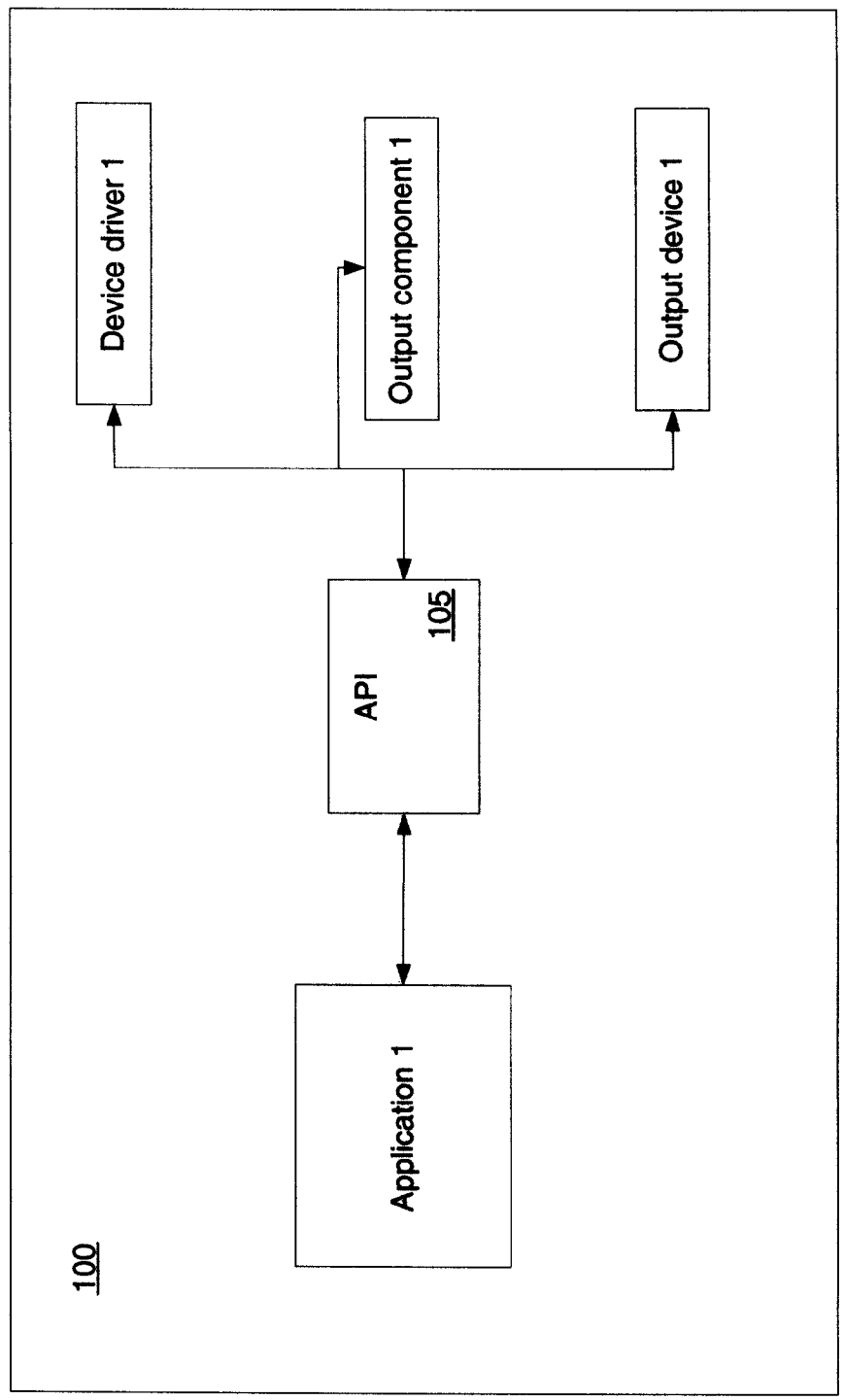
FIG. 1 is a block diagram of a prior art data processing system.

A prior art data processing system 100 for handling outputs (e.g. audio signals, video signals etc.) is shown in FIG. 1 comprising one or more applications (i.e. Application 1). Application 1 communicates with an Application Programming Interface ("API") 105. An API 105 is provided as a feature of an Operating System (OS) and defines a language and/or message format by which an application can communicate with the OS.

A device driver (i.e. Device driver 1) registers with the API 105 and provides registration data e.g. a device driver identifier; execution data associated with execution of the device driver e.g. path information; a type of output handled by the device driver (e.g. audio signals, video signals etc.).

A device driver is designed to interface with the OS and to operate, at a low level, an output component (i.e. Output component 1) (e.g. a sound card, a video card etc.). An output component is associated with an output device (i.e. Output device 1) (e.g. a speaker, a display monitor etc.).

In an example, Application 1 requests to execute an output (e.g. an audio signal) by sending a message to the API 105. The message comprises a function "play (audio.123)", where "audio.123" is a file stored in a particular location on the data processing system. The sound file comprises content data (e.g. an audio signal), content metadata (i.e. an identifier associated with the audio signal) and further metadata (e.g. an identifier of an application from which the audio.123 file originates (e.g. "App_1"); volume data (e.g. "vol=5"); type of sound (e.g. stereo sound) etc). The API 105 compares content metadata in the audio.123 file with the registration data of a device driver to send the message to an appropriate device driver (e.g. Device driver 1 which is a sound card that handles audio signals).

In response to receiving the message, the device driver converts the message to low level data associated with one or more operations understandable by the associated output component (e.g. a sound card). The sound card executes the one or more operations and an audio signal is output using an associated output device (e.g. Output Device 1 which is a speaker).

Figure 2:
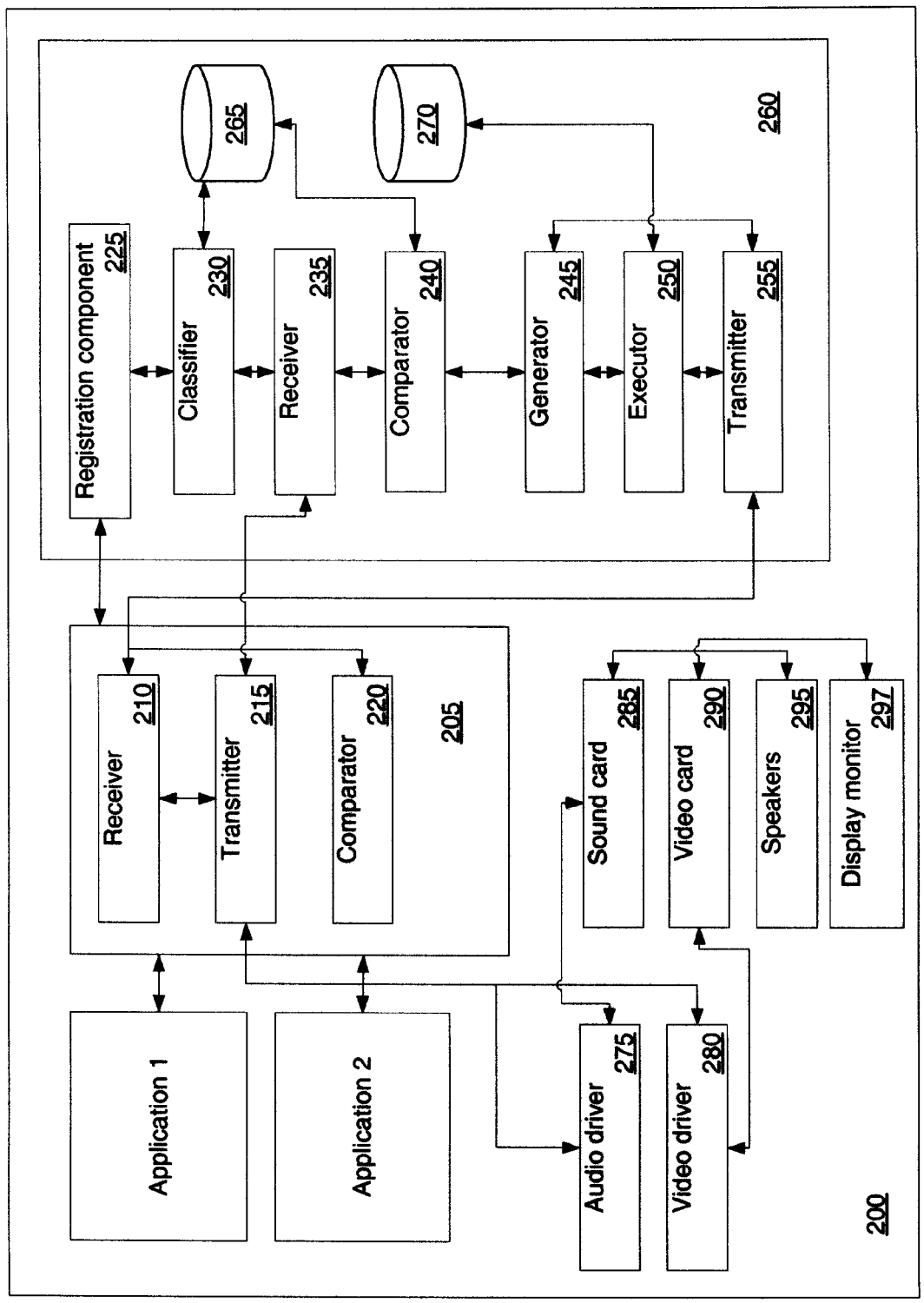
FIG. 2 is a block diagram of a data processing system according to the preferred embodiment.
Figure 3:
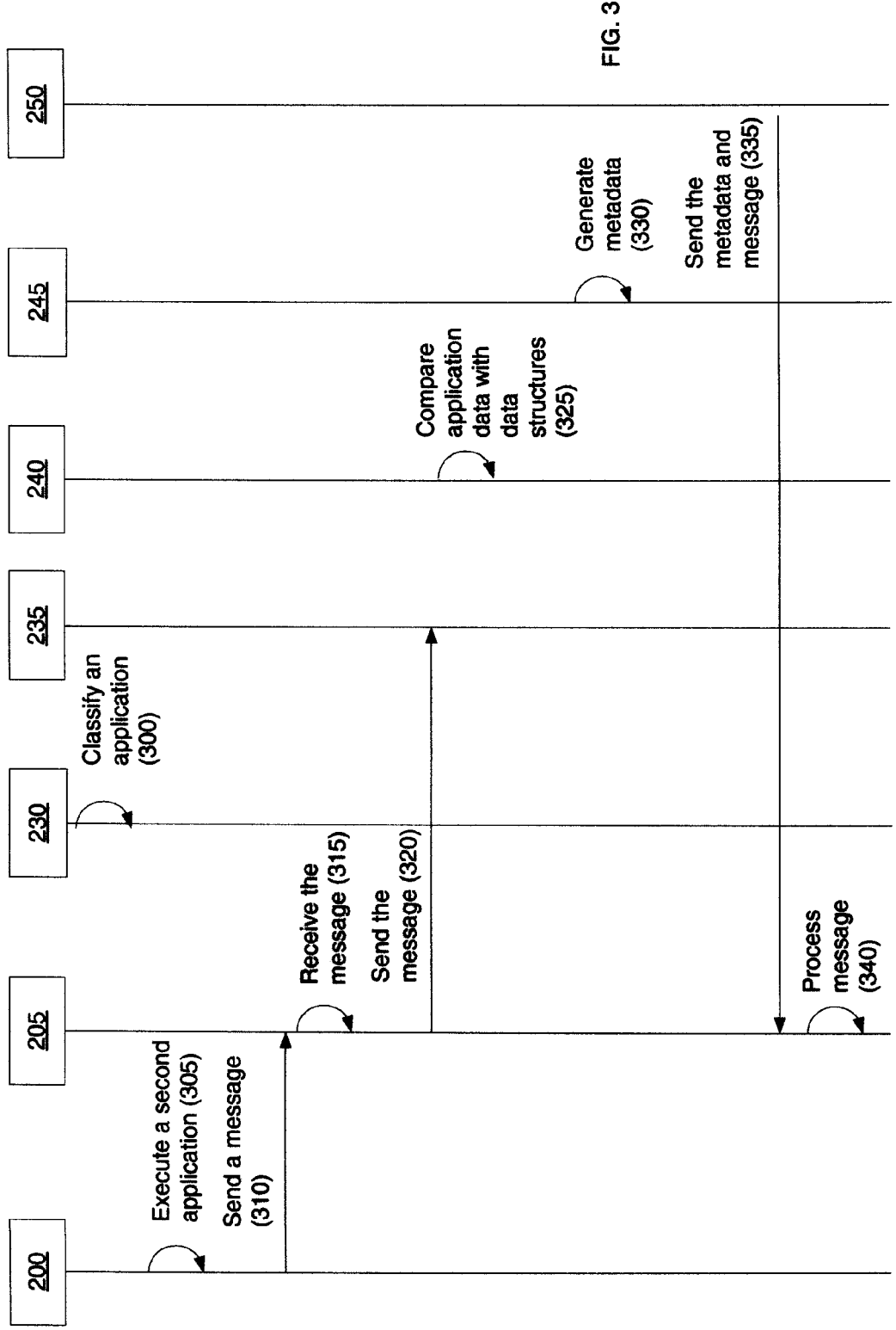
FIG. 3 is a flow chart showing the operational steps involved in a process according to a preferred embodiment.

A client data processing system 200 according to a preferred embodiment will now be described with reference to FIG. 2. It should be understood that a server data processing system can equally be implemented with the present invention. The client data processing system 200 comprises a plurality of applications (i.e. Application 1 and Application 2) that communicate with an API 205. At least one application generates a message, wherein the message comprises a function associated with a file and wherein the file comprises content metadata and metadata.

The API 205 comprises a first receiver 210, for receiving a message from an application. The API 205 also comprises a first transmitter 215 for transmitting data to a second receiver 235 of a handler 260. The data comprises an identifier associated with an executing application if a single application is executing. Alternatively, the data comprises the entire message if a single application is executing. The data comprises an entire message if more than one application is executing. The first transmitter 215 is also operable to transmit data to at least one of: an audio driver 275 and a video driver 280, wherein the data comprises an entire message. The API 205 also comprises a first comparator 220 for comparing an identifier of content data of a message with registration data of the handler 260 and at least one of the audio driver 275 and the video driver 280.

The audio driver 275 and the video driver 280 are configurable to communicate with the API 205. The audio driver 275 and the video driver 280 register device driver registration data with the API 205. The audio driver 275 and the video driver 280 are associated with a sound card 285 and a video card 290 respectively. The sound card 285 and the video card 290 are associated with speakers 295 and a display monitor 297 respectively.

The handler 260 further comprises a registration component 225 for registering handler registration data with the API 205. The registration data can comprise an identifier associated with the handler; execution data associated with execution of the handler 260 (e.g. path information); a type of output handled by the handler etc.

It should be understood that preferably, the handler 260 is implemented at an application level. Thus, any processing carried out by the handler 260 is applied to output from an originating application and the resulting output is passed by the API 205 to an appropriate device driver.

The handler 260 further comprises a classifier 230 for classifying an application.

In one example, the classifier 230 uses one or more application properties associated with the application to classify the application against one or more classes. For example, the classifier 230 uses a type of output of three applications (e.g. audio signal; video signal; text respectively) to associate the three applications with the following classes respectively "Audio"; "Video" and "Text". In another example, the classifier 230 monitors usage of three applications (e.g. a media player; a browser; an application used for collaboration) to associate the three applications with the following classes respectively "Media player"; "Browser"; "Collaboration".

It should be understood that based on application properties, an application may be classifiable against a plurality of classes. In this case, preferably, a single class is selected and associated with the application. In one example, the classifier 230 receives a selection input from a user, an administrator etc. In another example, the classifier 230 randomly selects a single class. In yet another example, the classifier 230 automatically selects a class by mining historical statistics. In one example, the statistics are associated with a type of output most frequently produced by the application. Thus, for example, if an application can be associated with an "Audio" class and a "Video" class and if based on statistics, it is determined that the application most frequently produces audio signal, the application is associated with the "Audio" class. In another example, the statistics are associated with a usage type that occurs most frequently. Thus, for example, if an application can be associated with a "Browser" class and a "Collaboration" class and if based on the statistics, it is determined that the most frequent usage of the application is for collaboration purposes, the application is associated with a "Collaboration" class.

It should be understood that if it is not possible to classify an application into pre-existing classes, preferably a new class is determined. In one example, the classifier 230 receives a new class input from a user, an administrator etc. In another example, the classifier 230 automatically determines a new class—e.g. by parsing metadata associated with a type of output of an application. In an example, an output (i.e. a textual message) is parsed and compared against a list of known protocols in order to determine a protocol associated with the output e.g. XML, HTML etc. The classifier 230 generates a class identifier (e.g. "XML"; "HTML" etc.) in response to determining the protocol and associates the application with the class.

Alternatively the classifier 230 can classify the application by receiving input from a user, an administrator etc. Furthermore, preferably, a user or an administrator is able to override a class assigned by the classifier 230.

Preferably, an identifier of an application and an identifier of its associated class are stored in a list residing on a storage device 265.

Preferably each class has one or more associated class properties. An example of a class property comprises "Real time" (i.e. wherein output associated with an application is to be executed in real-time). Another example comprises "Catch up" i.e. wherein output associated with an application is to be executed in "catch up" mode. For example, an output (e.g. video signal) is buffered and later executed (e.g. at a faster speed (i.e. a higher frame rate) than a real time speed of the output) so as to reach a current execution stage of real time execution of the output. Yet another example comprises "Buffer", wherein output associated with an application is buffered. Yet another example comprises "Discard", wherein output associated with an application is discarded.

Preferably, data associated with a class and its associated class property is stored in a class property database residing on the storage device 265. Preferably a class property can be set by a user, an administrator etc. Alternatively, a class property can be automatically determined e.g. by mining historical statistics.

The classifier 230 assigns priorities to classes which specify priority of handling outputs of applications with different classes. The priorities are stored in a class priority database residing on the storage device 265. In one example, first output of an application associated with a first class priority can override (in execution) second output of an application associated with a second class priority (e.g. the second output is suppressed (e.g. discarded, buffered for later use etc.)). In another example, first output of an application associated with a first class priority can be emphasised (in execution) over second output of an application associated with a second class priority. For example, a first output is executed at a higher volume than the second output. For a class_x, this is represented in the class priority database as "Emphasise class_x".

Preferably, one or more rules are associated with an emphasised class, wherein the one or more rules are stored in a rule base residing on the storage device 265.

Preferably, at least one of: a class priority and a rule can be set by a user, an administrator etc. Alternatively, at least one of: a class priority and a rule can be automatically determined e.g. by mining historical statistics.

Preferably each application has an associated application priority, which specifies priority of handling outputs of applications within a same class. Thus, multiple applications having the same associated class can be distinguished from each other. For example, an e-mail application and an instant messaging application each have the same associated class, namely, "Collaboration". However, the instant messaging application has a priority of "1" which is a higher priority than that of the e-mail application which has a priority of "2".

Preferably, data associated with an application and its associated priority is stored in an application priority database residing on the storage device 265.

It should be understood that if multiple applications have the same priority value, preferably, a single application is selected and assigned a higher priority value. In one example, an application priority input is received from a user, an administrator etc. In another example, an application is randomly selected.

Preferably an application priority can be set by a user, an administrator etc. Alternatively, an application property can be automatically determined e.g. by mining historical statistics.

It should be understood that although the storage device 265 is depicted as residing on the client data processing system 200, the storage device 265 can reside on any number of data processing systems. In one example, the storage device 265 resides on another data processing system remote from the client data processing system 200. In the example, the client data processing system 200 is operable to obtain the data in the storage device 265 by connecting to the remote data processing system or is operable to obtain the data by copying the data from the remote data processing system.

The handler 260 further comprises a second comparator 240 for comparing data associated with a class with one or more data structures (e.g. the class property database; the class priority database; the rule base and the application priority database).

The handler 260 further comprises a generator 245 for generating metadata and an executor 250 for executing an action. The executor 250 has access to a buffer 270. The handler 260 further comprises a second transmitter 255 for transmitting a message comprising generated metadata to the first receiver 210 of the API 205.

A first example of the preferred embodiment will now be described with reference to FIGS. 2-7. In the first example, Application 1 is a Voice Over IP (VOIP) application and Application 2 is a media player.

The registration component 225 registers handler registration data with the API 205. In the example, the handler registration data is shown below:

Handler registration data:
ID: Handler_1
Execution data: Root/Applications/Handler_1.exe
Type of Output: Audio; Video; Text Furthermore, the audio driver 275 and the video driver 280 register device driver registration data with the API 205. In the example, the device driver registration data is shown below:

Device driver registration data:
ID: Audio_Device_Driver
Execution data: Root/Drivers/Audio_DD.exe
Type of Output: Audio
ID: Video_Device_Driver
Execution data: Root/Drivers/Video_DD.exe
Type of Output: Video At step 300, the classifier 230 classifies each of the applications. However it should be understood that alternatively, a subset of the applications can be classified.

In the example, the classifier 230 classifies Application 1 against a class "Audio" and classifies Application 2 against a class "Media Player". Preferably, an identifier of an application and an identifier of its associated class are stored in a list residing on the storage device 265.

List:
Application ID: Application_1
Class ID: "Audio"
Application ID: Application_2
Class ID: "Media Player"

Each of the classes has a class property. With reference to the class property database in FIG. 4, the class "Audio" has a property of "Real Time" and the class "Media Player" has a property of "Real Time". Thus, each application has the following associated data:

Application ID: Application_1
Class ID: "Audio"
Property: "Real Time"
Application ID: Application_2
Class ID: "Media Player"
Property: "Real time"

A single application, i.e. Application 2 is executed on the client data processing system 200—no other application is executing. Application 2 generates an output (i.e. a video signal of a movie) and requests to execute the output by sending a message to the API 205. The message comprises a function "play (video.123)", wherein "(video.123)" is a file comprising content data (i.e. a video signal); content metadata (i.e. an identifier associated with the video signal) and further metadata (e.g. an identifier of the application from which the video.123 file originates (e.g. "Application_2")). It should be understood that a format of the file "(video.123)" described herein is exemplary and that a file can have several types of content data (e.g. an audio signal and a video signal). The message is shown below.

Message:
play (video.123(video_signal; Application_2))

The first receiver 210 of the API 205 receives the message and passes the message to the first comparator 220. The first comparator 220 compares an identifier (i.e. "video_signal") of content data with the registration data of the handler 260, the audio driver 275 and the video driver 280. In response to the comparison, the first comparator 220 determines that the identifier (i.e. "video_signal") matches registration data (i.e. data associated with a "Type of Output" field) of the handler 260 and the video driver 280.

The first transmitter 220 uses the execution data of the handler 260, i.e. "Root/Applications/Handler_1.exe", to transmit data to the second receiver 235. In the first example, as a single application is executing, i.e. Application 2, the data comprises an identifier (i.e. "Application_2") associated with the application (i.e. the data does not comprise the entire message).

The second comparator 240 compares the application identifier against the list to obtain the class associated with Application 2, i.e. "Media Player".

The first transmitter 220 uses the execution data of the video driver 280, i.e. "Root/Drivers/Video_DD.exe", to transmit data (i.e. the message "play (video.123(video_signal; Application_2))") to the video driver 280.

In response to receiving the message, the video driver 280 converts the message to low level data associated with one or more operations understandable by the associated output component (i.e. the video card 290). The video card 290 executes the one or more operations and the video signal is output using an associated output device (i.e. the display monitor 297).

At step 305, Application 1 is executed on the client data processing system 200 whilst Application 2 is still executing (i.e. the video signal is being output). Application 1 generates an output (i.e. an audio signal of a voice message) and requests to execute the output by sending (step 310) a message to the API 205. The message comprises a function "play (audio.123)" wherein "audio.123" is a file comprising content data (i.e. an audio signal); content metadata (i.e. an identifier of the audio signal) and further metadata (e.g. an identifier of the application from which the (audio.123) file originates (e.g. "Application_1"); volume data (i.e. "5")). It should be understood that a format of the file "(audio.123)" described herein is exemplary and that a file can have several types of content data (e.g. an audio signal and a video signal). The message is shown below.

Message:
play (audio.123 (audio_signal; Application_1; vol=5))

In the prior art, the first receiver 210 of the API 205 receives the message and passes the message to the first comparator 220. The first comparator 220 compares an identifier (i.e. "audio_signal") of content data with the registration data of the audio driver 275 and the video driver 280. In response to the comparison, the first comparator 220 determines that the identifier (i.e. "audio_signal") matches registration data (i.e. data associated with a "Type of Output" field) of the audio driver 275. The first transmitter 220 uses the execution data of the audio driver 275, i.e. "Root/Drivers/Audio_DD.exe", to transmit data (i.e. the message "play (audio.123 (audio_signal; Application_1; vol=5))") to the audio driver 275. In response to receiving the message, the audio driver 275 converts the message to low level data associated with one or more operations understandable by the associated output component (i.e. the sound card 285). The sound card 285 executes the one or more operations and the audio signal is output using an associated output device (i.e. the speakers 295). Thus, the video signal from Application 2 and the audio signal from Application 1 are both output on the data processing system 100 simultaneously. This is confusing for a user.

According to a preferred embodiment, the first receiver 210 of the API 205 receives (step 315) the message and passes the message to the first comparator 220. The first comparator 220 compares an identifier (i.e. "audio_signal") of content data with the registration data of the handler 260, the audio driver 275 and the video driver 280. In response to the comparison, the first comparator 220 determines that the identifier (i.e. "audio_signal") matches registration data (i.e. data associated with a "Type of Output" field) of the handler 260 and the audio driver 275.

The first transmitter 220 uses the execution data of the handler 260, i.e. "Root/Applications/Handler_1.exe", to transmit (step 320) data to the second receiver 235. In the first example, as more than one application is executing (i.e. Application 1 and Application 2), the data comprises an entire message.

The second comparator 240 compares (step 325) the application identifier in the message (i.e. "Application_1") against the list to obtain the class identifier associated with Application 1, i.e. "Audio".

The second comparator 240 compares (step 325) the class identifier associated with Application 1 (i.e. "Audio") and the class identifier associated with Application 2 (i.e. "Media Player") with the class priority database depicted in FIG. 5.

In response to the comparison, the second comparator 240 determines that the class priority represents "Emphasise Audio".

Preferably, the second comparator 240 is operable to access (step 325) the rule base in order to obtain one or more rules associated with the class priority "Emphasise Audio".

With reference to the rule base depicted in FIG. 6, for each emphasised class, there is an associated rule and rule logic execution data (i.e. execution data such as path information associated with rule logic for processing a rule). It should be understood that the rule logic can reside on a number of data processing systems (e.g. the client data processing system 200; a data processing system remote from the client data processing system 200 etc.).

In response to the comparison, the second comparator 240 determines that the rule comprises "Increase volume by 50%". The executor 250 uses the "Rule logic execution data" (i.e. Root/Rule_Logic/Volume.exe) to execute rule logic and passes the rule to the rule logic. The rule logic processes the rule and sends resulting metadata (i.e. "vol=7.5") to the second receiver 235. The second receiver 235 passes the resulting metadata to the generator 245.

The generator 245 uses the resulting metadata to generate (step 330) metadata associated with the audio.123 file, which is represented below.

Metadata:
(audio_signal; Application_1; vol=7.5)).

In response to generation of the metadata, the second comparator 240 accesses (step 325) the class property database shown in FIG. 4 in order to determine a property associated with the class "Audio".

With reference to the class property database shown in FIG. 4, for each class, there is an associated property and property logic execution data (i.e. execution data such as path information associated with property logic for processing a property). It should be understood that the property logic can reside on a number of data processing systems (e.g. the client data processing system 200; a data processing system remote from the client data processing system 200 etc.).

In response to the comparison, the second comparator 240 determines that the property comprises "Real Time". The executor 250 uses the "Property logic execution data" (i.e. Root/Property_Logic/Real_Time.exe) to execute property logic and passes the message "play (audio.123 (audio_signal; Application_1; vol=7.5)) to the property logic.

The property "Real Time" governs that output (i.e. the audio signal) is to be executed in real-time. In the first example, the property logic sends the message back to the second transmitter 255 such that the audio signal can be executed in real time.

The second transmitter 255 sends (step 335) the message comprising the generated metadata to the first receiver 210 of the API 205. The first receiver 210 passes the message to the first transmitter 220.

The first transmitter 220 uses (step 340) the execution data of the audio driver 275, i.e. "Root/Drivers/Audio_DD.exe", to transmit data (i.e. the message "play (audio.123 (audio_signal; Application_1; vol=7.5))) to the audio driver 275.

In response to receiving the message, the audio driver 275 converts the message to low level data associated with one or more operations understandable by the associated output component (i.e. the sound card 285). The sound card 285 executes the one or more operations and the audio signal is output using an associated output device (i.e. the speakers 295).

Advantageously, in the first example, a video signal and an audio signal are output simultaneously and the audio signal is emphasised by begin executed at a higher volume. Thus, the preferred embodiment provides a mechanism that does not need to make use of additional interrupts (e.g. a text notification etc.) that can be distracting and frustrating for a user. Furthermore, although multiple outputs are executed simultaneously, by executing the audio signal at a higher volume, a user can distinguish between the outputs.

Furthermore, a class based structure provides a fine grained mechanism for handling output from applications, as further aspects for handling can be provided with the structure e.g. priority of a class and an application, rule-based and property-based decisions etc.

In a second example, a class "Collaboration" has a property of "Real Time" and a class "Media player" has a property of "Real Time". Preferably, when output associated with the class "Collaboration" and output associated with the class "Media player" is to be executed simultaneously, the first receiver 235 receives messages associated with the outputs. The second comparator 240 determines an overall class priority (e.g. wherein the class priority represents that output associated with the class "Collaboration" overrides (in execution) output associated with the class "Media player"). Preferably, the second comparator 240 passes the message associated with the output of the class "Collaboration" to the second transmitter 255 which passes the message to the API 205. The message is processed using the appropriate device driver, output component and output device and the output is executed on the client data processing system 200. Preferably, the generator 245 generates metadata associated with the output of the class "Media player". For example, the generator 245 generates the following metadata associated with the file audio.123 i.e. "(empty)". Thus, the second transmitter 255 passes the following message associated with the output of the class "Media player" to the API 205: play (audio.123 (empty)). Thus, when the message is processed using the appropriate device driver, output component and output device, the output is not executed on the client data processing system 200, as there is no associated output to execute. In this way, output associated with the class "Collaboration" overrides (in execution) output associated with the class "Media player".

In a third example, if a class has a property of "Buffer", the executor 250 buffers the output associated with the class by using the buffer 270. In response to an event (e.g. once output associated with another overriding class has completed executing), the executor 250 is operable to access the buffered output and pass the buffered output with its original message to the second transmitter 255. The second transmitter 255 passes the message to the API 205. The message is processed using the appropriate device driver, output component and output device and the output is executed on the client data processing system 200.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

We claim:

1. An apparatus for managing outputs of a first application and a second application, each application operable to execute on a data processing system, wherein output of the first application is executed on the data processing system, the apparatus comprising:
   a memory;
   a classifier for associating a first application and a second application with classification data, each application operable to execute on a data processing system, the first application and the second application each generating an output that is executable on the data processing system, wherein the classification data is stored in a classification data structure;
   a comparator for comparing the classification data associated with the first application and the second application with the classification data structure to determine a priority, the priority indicating a preference for one of the output of the first application and the output of the second application, the comparator, in response to determining the priority, accessing a rule base to obtain a rule associated with the priority;
   a generator, responsive to determination of the priority, for generating metadata associated with execution of at least one of the output of the first application and the output of the second application, the metadata generated based on the rule associated with the priority; and
   a transmitter for transmitting the metadata to a function associated with an operating system of the data processing system;
   wherein the classifier, the comparator, the generator, and the transmitter comprise one or more of logic hardware and executable code, the executable code stored on a non-transitory computer readable storage medium.

2. The apparatus of claim 1, further comprising a receiver for receiving execution data generated in response to execution of the rule.

3. The apparatus of claim 2, further comprising a receiver for receiving execution data generated in response to execution of the rule.

4. The apparatus of claim 1, wherein the generator is operable to use the execution data to generate the metadata.

5. The apparatus of claim 1, wherein the function associated with the operating system passes the metadata to one or more components associated with executing output of an application on the data processing system.

6. A method for managing outputs of a first application and a second application, comprising the steps of:
   associating, using a classifier, a first application and a second application with classification data, each application operable to execute on a data processing system, the first application and the second application each generating an output that is executable on the data processing system, wherein the classification data is stored in a classification data structure;
   comparing, using a comparator, the classification data associated with the first application and the second application with the classification data structure to determine a priority, the priority indicating a preference for one of the output of the first application and the output of the second application, the comparator, in response to determining the priority, accessing a rule base to obtain a rule associated with the priority;
   generating, using a generator, in response to determination of the priority, metadata associated with execution of at least one of the output of the first application and the output of the second application, the metadata generated based on the rule associated with the priority; and
   a transmitter for transmitting the metadata to a function associated with an operating system of the data processing system;
   wherein the classifier, the comparator, and the generator, and the transmitter comprise one or more of logic hardware and executable code, the executable code stored on a non-transitory computer readable storage medium.

7. The method of claim 6, further comprising the step of receiving execution data generated in response to execution of the rule.

8. The method of claim 7, further comprising the step of using the execution data to generate the metadata.

9. The method of claim 6, wherein classification data associated with an application comprises a property associated with execution of output of the application.

10. The method of claim 6, further comprising the step of transmitting the metadata to a function associated with an operating system of the data processing system.

11. The method of claim 10, wherein the function associated with the operating system passes the metadata to one or more components associated with executing output of an application on the data processing system.

12. A computer program comprising:
   a non-transitory computer readable storage medium storing computer usable program code for managing outputs of a first application and a second application, each application operable to execute on a data processing system, the first application and the second application each generating an output that is executable on the data processing system, said computer program product comprising:
   computer usable program code for associating the first application and the second application with classification data, wherein the classification data is stored in a classification data structure;
   computer usable program code for comparing the classification data associated with the first application and the second application with the classification data structure to determine a priority, the priority indicating a preference for one of the output of the first application and the output of the second application, a comparator, in response to determining the priority, accessing a rule base to obtain a rule associated with the priority;
   computer usable program code for generating, in response to determination of the priority, metadata associated with execution of at least one of the output of the first application and the output of the second application, the metadata generated based on the rule associated with the priority; and
   a transmitter for transmitting the metadata to a function associated with an operating system of the data processing system.

* * * * *